(12) United States Patent
Xu et al.

(10) Patent No.: US 12,005,591 B2
(45) Date of Patent: Jun. 11, 2024

(54) ULTRASONIC TESTING SYSTEM OF DUAL ROBOT ARMS AND METHOD THEREOF

(71) Applicant: BEIJING INSTITUTE OF TECHNOLOGY, Beijing (CN)

(72) Inventors: Chunguang Xu, Beijing (CN); Canzhi Guo, Beijing (CN); Juan Hao, Beijing (CN); Wanxin Yang, Beijing (CN); Xianchun Xu, Beijing (CN); Ruili Jia, Beijing (CN); Xinhao Zheng, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 661 days.

(21) Appl. No.: 17/051,072

(22) PCT Filed: Jul. 16, 2019

(86) PCT No.: PCT/CN2019/096113
§ 371 (c)(1),
(2) Date: Oct. 27, 2020

(87) PCT Pub. No.: WO2020/015624
PCT Pub. Date: Jan. 23, 2020

(65) Prior Publication Data
US 2021/0323161 A1    Oct. 21, 2021

(30) Foreign Application Priority Data
Jul. 16, 2018    (CN) .......................... 201810779181.0

(51) Int. Cl.
*B25J 9/16*    (2006.01)
*B25J 9/00*    (2006.01)
(Continued)

(52) U.S. Cl.
CPC ........... *B25J 9/1692* (2013.01); *B25J 9/0087* (2013.01); *G01N 29/04* (2013.01); *G01N 29/265* (2013.01);
(Continued)

(58) Field of Classification Search
CPC ...... B25J 9/1692; B25J 9/0087; B25J 9/1682; G01N 29/04; G01N 29/265; G01N 29/28;
(Continued)

(56) References Cited

U.S. PATENT DOCUMENTS 6,871,560 B2 *   3/2005   Shives ................. G01N 29/265
                                                        73/866
7,386,367 B2 *   6/2008   Watanabe .............. B25J 9/1697
                                                         901/7
(Continued)

FOREIGN PATENT DOCUMENTS

CN    102226677 A    10/2011
CN    102721746 A    10/2012
(Continued)

*Primary Examiner* — Khoi H Tran
*Assistant Examiner* — Christopher Scott
(74) *Attorney, Agent, or Firm* — John A. Miller; Shumaker, Kendrick & Loop LLP

(57) ABSTRACT

An ultrasonic testing system of dual robot arms and an ultrasonic testing method for use in testing quality of surface and interior of a workpiece. The system includes an extension rod provided between a tail-end of a master robot arm and an emitting probe and/or between a tail-end of a slave robot arm and a receiving probe. One or more connected extension rod rotating shafts is provided between the extension rod and the emitting probe or between the extension rod and the receiving probe. The method uses an X-axis constraint method to convert posture data of the discrete points in a trajectory file of the tested workpiece into Euler angles, and constrain the X-axes of the auxiliary coordinate systems (Continued)

at the same time so that the positive direction of the X-axis of each of the auxiliary coordinate systems is the trajectory tangent direction.

3 Claims, 3 Drawing Sheets

(51) Int. Cl.
  *G01N 29/04* (2006.01)
  *G01N 29/265* (2006.01)
  *G01N 29/28* (2006.01)
(52) U.S. Cl.
  CPC ..... *G01N 29/28* (2013.01); *G01N 2291/0289* (2013.01); *G01N 2291/2698* (2013.01)
(58) Field of Classification Search
  CPC ... G01N 2291/0289; G01N 2291/2698; G01N 29/041; G01N 29/043; G01N 29/225; G01N 2291/044; G01N 2291/045; G01N 2291/102; G01N 29/275; G01N 2291/023; G05B 2219/39109
  See application file for complete search history.

(56) References Cited

U.S. PATENT DOCUMENTS

| | | | |
|---|---|---|---|
| 9,333,042 B2 * | 5/2016 | Diolaiti | A61B 34/71 |
| 9,573,272 B2 * | 2/2017 | Meißner | B25J 9/1682 |
| 2007/0006658 A1 | 1/2007 | Kennedy et al. | |

FOREIGN PATENT DOCUMENTS

| | | |
|---|---|---|
| CN | 103868996 A | 6/2014 |
| CN | 104457612 A | 3/2015 |
| CN | 108982664 A | 12/2018 |

* cited by examiner

ULTRASONIC TESTING SYSTEM OF DUAL ROBOT ARMS AND METHOD THEREOF

CROSS-REFERENCE TO RELATED APPLICATIONS

This application is a National Stage application of International Application No. PCT/CN2019/096113 filed on Jul. 16, 2019 which claims priority to Chinese Patent Application Serial No. CN 201810779181.0 filed Mar. 15, 2018.

BACKGROUND

Field

The present disclosure belongs to the technical field of non-destructive ultrasonic testing, and in particular to an ultrasonic testing system of dual robot arms and method thereof.

Discussion of the Related Art

With the development of materials science and technology, the use of composite materials to replace metal materials for manufacturing a variety of workpieces has increased, especially the workpieces with complex curved surfaces in the aerospace field, as the composite materials has advantages of high stiffness to weight ratio, light weight, good corrosion resistance and fatigue resistance. The superior performance of composite materials undoubtedly provides a good opportunity for applying new technologies, new materials and optimizing the engine performance in this field, but the workpieces made by the composite materials have low testing efficiency and high testing cost.

In order to improve the testing efficiency and reduce the testing cost, for this composite material with a large ultrasonic attenuation coefficient, Beijing Institute of Technology has developed a ultrasonic testing system of dual robot arms with multi-degree of freedom based on ultrasonic transmission testing method (Xu Chunguang, Zhang Hanming et al. Non-destructive testing technology [J]; Electro-Mechanical Engineering, 2017, 33(02): 1-12). In addition, patent document with publication No. CN103868996A provides an automatic superposition method of coordinate systems of dual robot arms and workpiece for nondestructive testing. The method determines the position transformation relationship between the base coordinate systems of two robot arms, so that it only needs to determine the transformation relationship between the base coordinate system of one of the robot arms and the coordinate system of the workpiece when the tested workpiece is replaced, and the transformation relationship between the coordinate system of the workpiece and the base coordinate system of the other of the robot arms can be determined automatically. This method is simple in terms of operation, greatly saves the definition time of the coordinate system of the workpiece, expands the application range of the testing system of dual robot arms, and solves most of the problems of automatic testing for components with complex curved surfaces. However, for those semi-closed workpieces with narrow internal spaces, insufficient space for movement stops the robot arms for expanding into the interior of the workpiece to perform an ultrasonic transmission test. Therefore, this method cannot test the surface quality of semi-closed workpieces with a narrow internal space such as a cylinder.

SUMMARY

In view of this, the present disclosure is to provide an ultrasonic testing system of dual robot arms and a dual robot arms ultrasonic testing method by using the ultrasonic testing system of dual robot arms, by which the quality of surface and interior of the semi-closed workpiece with a narrow internal space can be tested.

One aspect of the present disclosure is to provide an ultrasonic testing system of dual robot arms, tail-ends of the robot arms being equipped with oppositely arranged emitting probe and receiving probe, respectively; each of the robot arms being connected with a controller; the tail-end of at least one of the robot arms is provided with an extension rod; the other end of the extension rod is provided with an extension rod rotating shaft (6); the probe of the robot arm realizes the equipment by mounting on the extension rod rotating shaft (6).

As a result, by providing an extension rod connected with the emitting probe or the receiving probe at the tail-end of at least one of the robot arms, it is possible to extend into the interior of the workpiece for testing quality of the interior and surface of the workpiece. And by providing an extension rod rotating shaft between the extension rod and the probe, it is possible to adjust the probe so that it is perpendicular to the surface of the workpiece, thereby receiving ultrasonic signals in a more effective way.

In some embodiments, the robot arms are a master robot arm (7) and a slave robot arm (8), the emitting probe is arranged at the tail-end of the master robot arm (7), the receiving probe opposing to the emitting probe is arranged at the tail-end of the slave robot arm (8), the emitting probe and the receiving probe keep perpendicular to a surface of a tested workpiece;

A master robot arm controller (10) is electrically connected with the master robot arm (7); and a slave robot arm controller (14) is electrically connected with the slave robot arm (8);

between the tail-end of the master robot arm (7) and the emitting probe or/and between the tail-end of the slave robot arm and the receiving probe, an extension rod whose length direction is parallel to the axis of the tested workpiece is provided;

between the extension rod and the emitting probe or/and between the extension rod and the receiving probe, the equipment is realized by the extension rod rotating shaft (6).

As a result, by providing the extension rod between the master robot arm and the emitting probe and/or between the slave robot arm and the receiving probe, it helps the probe(s) to extend into the semi-closed workpiece with a narrow internal space so as to test the quality of the surface and interior of the workpiece. And by providing the extension rod rotating shaft between the extension rod and the emitting probe or/and between the extension rod and the receiving probe, it is possible to control the rotation of the extension rod rotating shaft automatically or via the robot arm controllers, so that the receiving probe and the emitting probe keep perpendicular to the surface of the workpiece, thereby ensuring the emitting and receiving efficiency of the ultrasonic signals.

Another aspect of the present disclosure is to provide a dual robot arms ultrasonic testing method which uses the ultrasonic testing system of dual robot arms to test quality of a tested workpiece, including:

a step 1 of calibrating a coordinate system of the tested workpiece for the ultrasonic testing system of dual robot arms, and determining relationships of the coordinate system of the tested workpiece in relative to base coordinate systems of the master and slave robot arms;

a step 2 of performing a trajectory planning on the tested workpiece to generate a trajectory file of discrete points of the coordinate system of the tested workpiece; the trajectory file including coordinates and posture data;

a step 3 of building auxiliary coordinate systems in the coordinate system of the workpiece, using a X-axis constraint method to constrain the X-axes of the auxiliary coordinate systems so that a positive direction of the X-axis of each of the auxiliary coordinate systems is a tangent direction of the trajectory, and using the X-axis constraint method to convert the posture data of the discrete points generated in the step 2 into Euler angles;

a step 4 of converting the coordinates of the discrete points generated in the step 3 and the converted Euler angles of the discrete points in the step 3 into coordinates and Euler angles of the base coordinate systems of the master and slave robot arms according to the relationships among the coordinate system of the workpiece and base coordinate systems of the master and slave robot arms, and then downloading the resulting coordinates and the Euler angles to the master and slave robot arm controllers, respectively;

a step 5 of inputting transformation relationship of a tool coordinate system of the master robot arm in relative to a flange coordinate system of the master robot arm to the master robot arm controller, and inputting transformation relationship of the tool coordinate system of the slave robot arm in relative to a flange coordinate system of the slave robot arm to the slave robot arm controller; and a step 6 of bringing the testing system of dual robot arms into an operating state, and controlling, by the master and slave robot arm controllers respectively, the master and slave robot arms having the probes to comprehensively test the tested workpiece.

As a result, by providing the extension rod, it helps the probe(s) to extend into the semi-closed workpiece with a narrow internal space so as to test the quality of surface and interior of the workpiece. And by providing the extension rod rotating shaft, it is possible to adjust the receiving probe and the emitting probe so that they are kept perpendicular to the surface of the workpiece, thereby improving the reliability of testing results. By using the X-axis constraint method, the X-axis of each of the auxiliary coordinate systems is corrected so that it is in the tangent direction of the trajectory, that is the extension rod is kept parallel to the central axis of the workpiece, thereby avoiding collision between the robot arm and the workpiece. In addition, by converting the posture data in the trajectory data into Euler angles, the trajectory data is thus readable to the controllers of the master and slave robot arms so that the robot arms with the probes can be controlled based on the trajectory data to perform a full-coverage quality test.

In some embodiments, the step of using the X-axis constraint method to constrain the X-axis of each of the auxiliary coordinate systems comprising:

building an imaginary X-axis for each of the auxiliary coordinate systems in the coordinate system of the workpiece so that the imaginary X-axis is in a secant direction of the trajectory, and by taking two points $b(x_b,y_b,z_b)$ and $c(x_c,y_c,z_c)$ on the imaginary X-axis, expressing a vector of the imaginary X-axis as: $ox'=(x_c-x_b,y_c-y_b,z_c-z_b)$, setting a Z-axis for each of the auxiliary coordinate systems as a cutter shaft vector of the point b and expressing its vector as: $oz=(t_x,t_y,t_z)$, obtaining a vector of a Y-axis for each of the auxiliary coordinate systems by the following equation:

$$oy = oz \times ox'$$

$$= \begin{pmatrix} (t_y(z_c-z_b)-t_z(y_c-y_b), t_z(x_c-x_b)- \\ (t_x(z_c-z_b), t_x(y_c-y_b)-t_y(x_c-x_b)) \end{pmatrix}$$

$$= (oy_x, oy_y, oy_z)$$

obtaining the vector of the corrected X-axis for each of the auxiliary coordinate systems by a cross product of oy and oz in order to be in a tangent direction of the trajectory, wherein the equation of the cross product is as follow:

$$ox = oy \times oz$$

$$= \begin{pmatrix} (t_z(x_c-x_b)-t_x(z_c-z_b))(z_c-z_b)-(t_x(y_c-y_b)-t_y(x_c-x_b))(y_c-y_b), \\ (t_x(y_c-y_b)-t_y(x_c-x_b))(x_c-x_b)-(t_y(z_c-z_b)-t_z(y_c-y_b))(z_c-z_b), \\ (t_y(z_c-z_b)-t_z(y_c-y_b))(y_c-y_b)-(t_z(x_c-x_b)-t_x(z_c-z_b))(x_c-x_b) \end{pmatrix}$$

$$= (ox_x, ox_y, ox_z)$$

In some embodiments, the converting step of the Euler angles in the step 3 comprising: obtaining the Euler angles of the coordinate system of the workpiece based on the equal relationship between an Euler angles transformation matrix and a rotation matrix:

$\alpha = A \tan 2(-p_y,p_z) \times 180/\pi$ $\beta = A \tan 2(p_x,\sqrt{p_y^2+p_z^2}) \times 180/\pi$ $\gamma = A \tan 2(-n_y,n_x) \times 180/\pi$, wherein:

$$p_x = \frac{t_x}{\sqrt{t_x^2+t_y^2+t_z^2}}; p_y = \frac{t_y}{\sqrt{t_x^2+t_y^2+t_z^2}};$$

$$p_z = \frac{t_z}{\sqrt{t_x^2+t_y^2+t_z^2}}; n_y = \frac{ox_y}{\sqrt{ox_x^2+ox_y^2+ox_z^2}};$$

$$n_x = \frac{ox_x}{\sqrt{ox_x^2+ox_y^2+ox_z^2}}.$$

As a result, the Euler angles of the coordinate system of workpiece can be obtain by equal relationship between the Euler angles transformation matrix and the rotation matrix, and then the Euler angles of the coordinate system of workpiece can be converted into the Euler angles of the base coordinate systems of master and slave robot arms readable to the controllers of the master and slave robot arms by the transformation relationships among the coordinate system of workpiece and the base coordinate systems of master and slave robot arms. Therefore, it is possible to control the movement of the robot arms according to the trajectory generated by the CAM software for a quality testing of the workpiece.

DETAILED DESCRIPTION OF THE EMBODIMENTS

Figure 1:
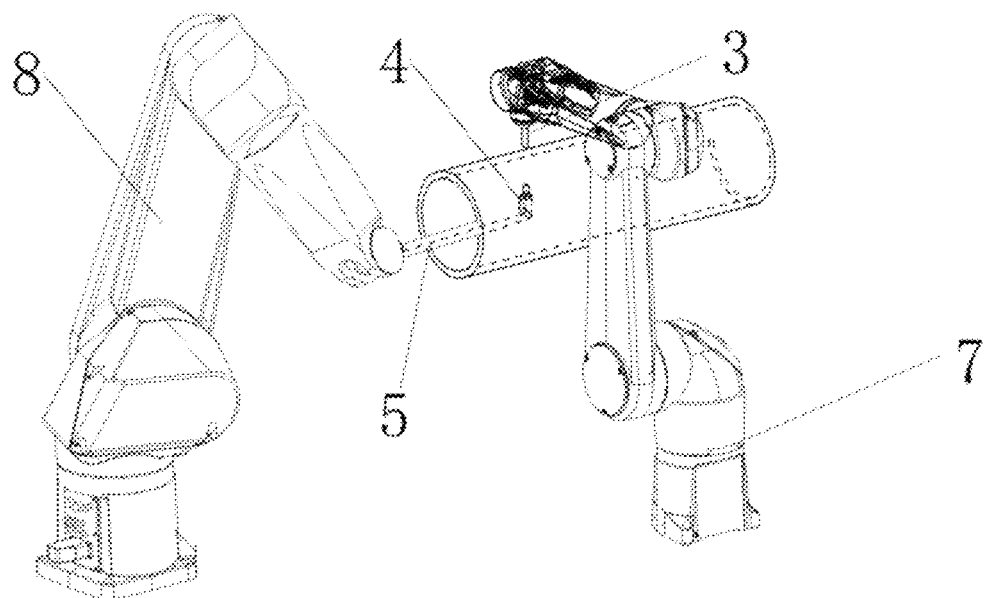
FIG. 1 is an axonometric view showing a collision accident between an extension rod and a workpiece.
Figure 2:
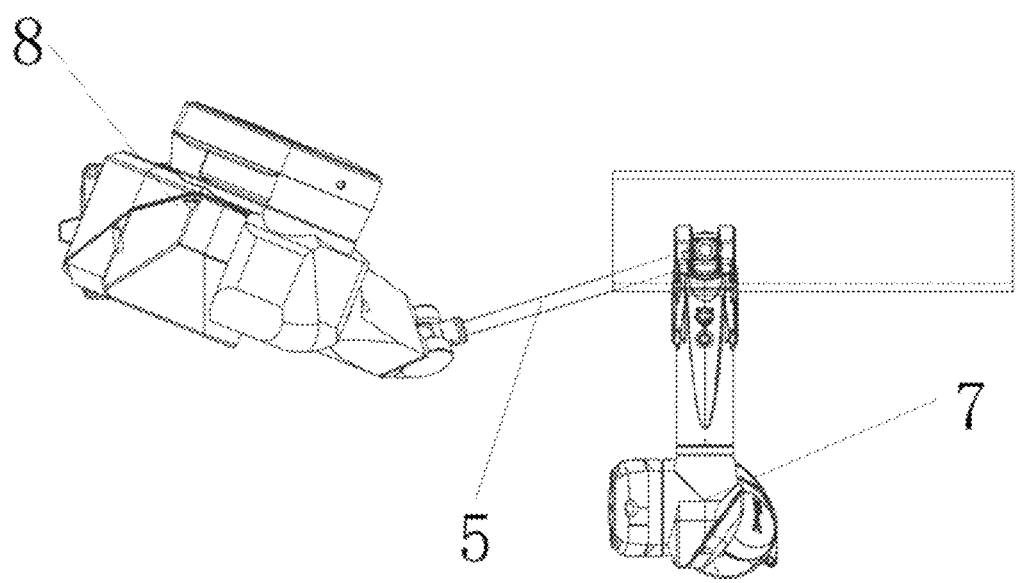
FIG. 2 is a plan view showing the collision accident between the extension rod and the workpiece.

In order to solve the problem that a receiving probe or an emitting probe cannot reach into a workpiece to perform testing, a robot arm may be equipped with an extension rod as a tool to extend into the internal space of the workpiece and perform testing. However, the robot arm with six degrees of freedom may collide with the workpiece due to enter-constraint or improper constraint of postures. As shown in FIG. 1 and FIG. 2, a robot arm 8 is equipped with an extension rod 5 on which an emitting probe 4 is installed, and a robot arm 7 is equipped with a receiving probe 3 at its tail-end, wherein the extension rod 5 collides with the tested workpiece and causes a testing accident. Therefore, it is necessary to propose a new testing method to solve the problem of collision between the probe and the workpiece.

Figure 3:
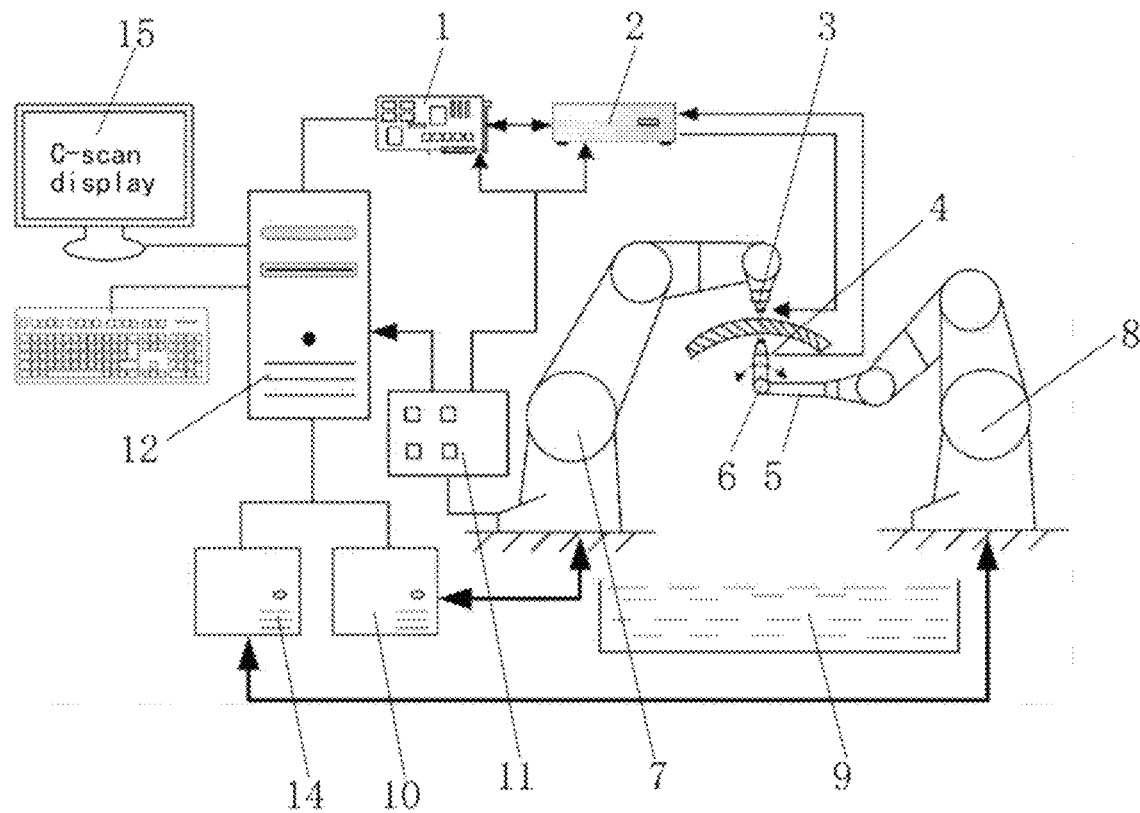
FIG. 3 is a schematic diagram of a dual robot arms system with an extension rod according to the present disclosure.

FIG. 3 shows an ultrasonic testing system of dual robot arms with an extension rod. The ultrasonic testing system includes an ultrasonic acquisition card 1 configured for collecting and storing ultrasonic data, a pulse transceiver 2 connected with the ultrasonic acquisition card 1 and configured for exciting a emitting probe to emit ultrasound waves and a receiving probe to receive ultrasound waves, a master robot arm 7 and a slave robot arm 8 that are provided fixedly, an emitting probe 3 connected with the pulse transceiver 2 and provided at the tail-end of the master robot arm 7, an extension rod 5 fixed with the tail-end of the slave robot arm 8, an extension rod rotating shaft 6 hinged with the tail-end of the extension rod 5, and a receiving probe 4 fixed with the tail-end of the extension rod rotating shaft 6. In this way, the extension rod rotating shaft 6 provided between the extension rod 5 and the receiving probe may make the receiving probe 4 rotatable relative to the extension rod 5, so that the emitting probe 3 and the receiving probe 4 arranged on two opposing sides of the tested workpiece can be both perpendicular to the tested workpiece and their central axes can coincide.

Figure 4:
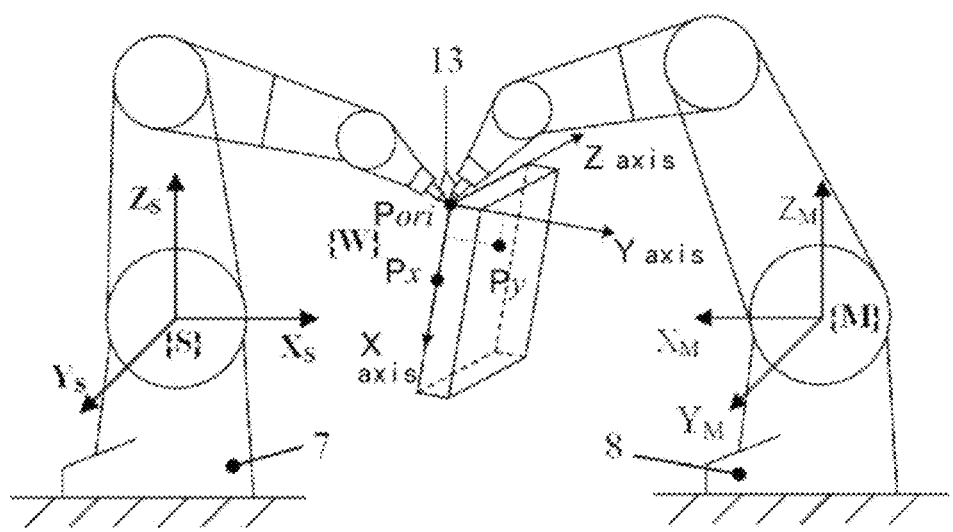
FIG. 4 is a schematic diagram for calibrating a coordinate system of the workpiece.
Figure 5:
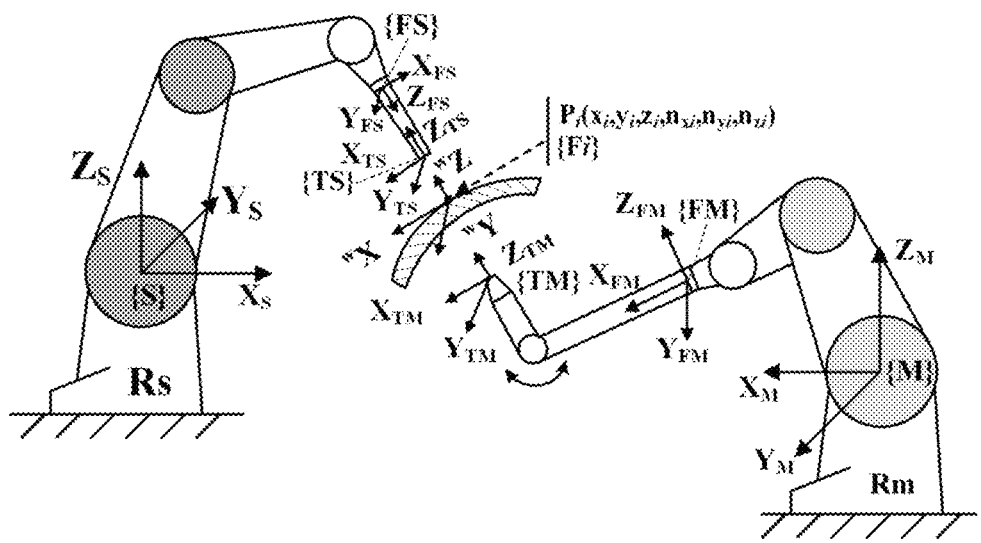
FIG. 5 is a schematic diagram showing the principle of motion control of the robot arms.

The system further includes a water tank 9 that provides a coupling medium for ultrasonic transmission (a water pump for sucking the water in the water tank and a water pipe nozzle for jetting on the tested workpiece are not shown), a master robot arm controller 10 connected with the master robot arm 7, a slave robot arm controller 14 connected with the slave robot arm 8, an industrial computer 12 connected with both the master robot arm controller 10 and the slave robot arm controller 14, a position acquisition card 11 connected with the industrial computer 12, the ultrasonic acquisition card 1 and the pulse transceiver 2 and configured for acquiring current testing positions of the robot arms, and a display device 15 connected with the industrial computer 12 and configured for displaying the testing results. As shown in FIG. 3 to FIG. 5, the extension rod rotating shaft 6 can be rotated according to the shape profile of the workpiece when testing the workpiece in order to comprehensively test the tested workpiece.

Before testing the workpiece, tips 13 of the master robot arm 7 and the slave robot arm 8 are first used to calibrate the position and orientation of the tested workpiece. When the ultrasonic acquisition card 1 starts activation, it is in the automatic mode in which it automatically triggers the pulse transceiver 2 to start operating, and then set the appropriate detection parameters. Once the robot arms are in motion, the ultrasonic acquisition card 1 switches to an external activation mode, in which other devices are required to trigger the ultrasonic acquisition card 1 to operate. The pulse transceiver 2 causes the emitting probe 3 situated at the outer surface of the tested workpiece to emit ultrasonic waves toward the tested workpiece via the aqueous medium and the receiving probe 4 situated at the inner surface of the tested workpiece to receive the ultrasonic waves via the coupling medium, and transmits the received ultrasonic waves to the ultrasonic acquisition card 1. The ultrasonic acquisition card 1 is connected with the industrial computer 12 and the display device 15 on which the received ultrasonic data can be displayed in 256 different colors. The ultrasonic data can be values between 0 and 255, wherein 0 means there is a defect, 255 means there is no defect, and a larger value represents a better surface quality or internal quality of the tested workpiece.

The industrial computer controls the angle of the rotating shaft 6 of the extension rod and the position and posture of the robot arm through controller 14 according to the shape of the surface of the tested workpiece, so that the receiving probe 4 can be perpendicular to the surface of the tested workpiece so as to receive the ultrasonic waves on the surface of the tested workpiece in a more effective manner. While the position acquisition card 11 starts acquisition, the ultrasonic acquisition card 1 and the pulse transceiver 2 are triggered to operate. The emitting probe 3 and the receiving probe 4 start to emit and receive ultrasonic waves respectively. The position acquisition card 11 collects the three-dimensional coordinates of the surface of the tested workpiece at the tail-end of emitting probe 3 and transmits the collected three-dimensional coordinates of the surface of the tested workpiece to the industrial computer 12 for displaying on the device 15. The user can estimate the surface and internal quality of the tested workpiece based on the three-dimensional coordinates and ultrasonic data.

The system has multiple degrees of freedom and a high degree of flexibility, and can test various workpieces with complex curved surfaces.

The ultrasonic testing method of dual robot arms is described in detail below.

The present disclosure provides an ultrasonic testing method of dual robot arms which utilizes the above-mentioned ultrasonic testing system of dual robot arms to test the quality of surface and interior of the semi-closed workpiece with a narrow internal space. This method can ensure that the emitting probe and the receiving probe keep perpendicular to the surface of the tested workpiece without collision between the robot arms and the workpiece during the testing of the tested workpiece.

This method first utilizes CAM software to project a trajectory of the tested workpiece so as to generate a trajectory file of the tested workpiece. Then the X-axis constraint method are applied to process the generated trajectory file and constrain the X-axes of the auxiliary coordinate systems so that the positive direction of the X-axis of each of the auxiliary coordinate systems is the tangent direction of the trajectory, which represents that the emitting probe and the receiving probe are perpendicular to the tested workpiece, and the processed trajectory file are then converted into a file readable to the robot arm controllers. Next, the resulting file are download to the robot arm controllers of the ultrasonic testing system of dual robot arms with the extension rod, so that the movement of the robot with the receiving probe mounted on the extension rod is controlled in such a way that the receiving probe keeps perpendicular to the tested workpiece without collision between the robot arms and the tested workpiece.

Before projecting the trajectory of the tested workpiece, the transformation relationships of the coordinate system of the workpiece relative to the base coordinate systems of the master and slave robot arms are determined in the first place. The following is the detailed derivation.

Firstly, some relationships among the base coordinate systems of the robot arms and the coordinate system of the workpiece are defined. One of the robot arms is the master robot arm (master robot arm for short, Rm), of which base coordinate system is {M}; the other one of the robot arms is the slave robot arm (slave robot arm for short, Rs), of which base coordinate system is {S}; coordinate system of the workpiece is {W}. Let the origin of the coordinate system of the workpiece be Pori, Px be a point on the X-axis, and Py be a point on the xoy plane located in the positive direction of the Y-axis. Then these three points, as shown in FIG. 5, are expressed as Pmo $\{x_{mo}, y_{mo}, z_{mo}\}$, Pmx $\{x_{mx}, y_{mx}, z_{mx}\}$, Pmy $\{x_{my}, y_{my}, z_{my}\}$ and Pso $\{x_{so}, y_{so}, z_{so}\}$, Psx $\{x_{sx}, y_{sx}, z_{sx}\}$, Psy $\{x_{sy}, y_{sy}, z_{sy}\}$ in the base coordinate systems of the master and slave robot arms, respectively.

Based on the right hand rule, it can be obtained:

$$\begin{cases} ^M X_W = \dfrac{(x_{mx}-x_{mo},\ y_{mx}-y_{yo},\ z_{mx}-z_{mo})}{\sqrt{(x_{mx}-x_{mo})^2+(y_{mx}-y_{yo})^2+(z_{mx}-z_{mo})^2}} \\ ^M \hat{Y}_W = \dfrac{(x_{my}-x_{mo},\ y_{my}-y_{mo},\ z_{my}-z_{mo})}{\sqrt{(x_{my}-x_{mo})^2+(y_{my}-y_{mo})^2+(z_{my}-z_{mo})^2}} \\ ^M Z_W = {}^M X_W \times {}^M \hat{Y}_w \\ ^M Y_W = {}^M X_W \times {}^M Z_W \end{cases} \quad (1)$$

In the equation (1):

$^M X_w$, $^M Y_w$, $^M Z_w$ represent expressions of unit vectors of the positive directions of the x-axis, y-axis, and z-axis of the coordinate system of the workpiece in the base coordinate system {M} of the master robot arm;

$^M \hat{Y}_w$ represents expressions of arbitrary unit vector of the positive direction of the y-axis of the xoy plane in the base coordinate system {M} of the master robot arm;

further, the transformation matrix of the coordinate system of the workpiece relative to the base coordinate system of the master robot arm is:

$$^M_w T = \begin{bmatrix} ^M X_W & ^M Y_W & ^M Z_W & Pmo \\ 0 & 0 & 0 & 1 \end{bmatrix}, \quad (2)$$

similarly, the transformation matrix of the coordinate system of the workpiece relative to the base coordinate system of the slave robot arm is:

$$^S_w T = \begin{bmatrix} ^S X_W & ^S Y_W & ^S Z_W & Pso \\ 0 & 0 & 0 & 1 \end{bmatrix}. \quad (3)$$

In this way, the transformation relationships of the coordinate system {W} of the workpiece relative to the base coordinate systems of the master and slave robot arms can be determined, respectively. FIG. 4 shows an example defining these coordinate systems.

Next, the commercial CAM software is used to plan a preliminary trajectory for the tested workpiece and generate a trajectory file including data of coordinates and postures.

However, the obtained trajectory file cannot be directly downloaded to the robot arm controllers for use, because this type of software was originally developed for the processing and production operations of the five-axis machining tools, not for the non-destructive testing by the robot arms. The format of a discrete point in the trajectory planned by the CAM software is [x, y, z, $t_x$, $t_y$, $t_z$], where the first three numbers represent the position of the discrete point in the coordinate system of the workpiece, and the last three numbers represent the projection of unit normal vectors of the discrete point on the x-axis, y-axis, and z-axis directions. These numbers contain basic information describing the spatial position and posture, but the last three numbers cannot be recognized by the robot arm controllers. Therefore, it is required to convert the last three numbers into XYZ-Euler angles recognized by the robot arm controllers.

The control principle of movement of the robot arms is to control the coordinate systems {TM} and {TS} of effectors at the ends of the robot arms to coincide with the auxiliary coordinate system {Fi} of an arbitrary discrete point on the workpiece. As shown in FIG. 5, coordinate systems {TM} and {TS} of the effectors at tail-ends of the robot arms are the tool coordinate systems of the master and slave robot arms, which are built based on the base coordinate systems of the master and slave robot arms. According to this principle, auxiliary coordinate systems for discrete points of the workpiece are built in the coordinate system of the workpiece to ensure that the effectors at the tail-ends of the robot arms move in correct postures (perpendicular to the surface of the tested workpiece in real time) and does not collide with the workpiece; then, the postures data of each discrete point of the workpiece in each of the auxiliary coordinate systems is transformed into XYZ-Euler angles. This is the principle of the X-axis constraint method of the present disclosure.

The following is the detailed derivation of the X-axis constraint method.

First, variables are defined as follows. $P_i$ is an arbitrary discrete point on the trajectory of the workpiece; {Fi} is the coordinate system of the discrete point in the coordinate system of the workpiece, which is referred to an auxiliary coordinate system of the workpiece herein; and {TM} and {TS} are the tool coordinate systems of the master and slave robot arms, respectively. In addition, when processing the trajectory file, it aims to make the trajectory file recognizable to the robot arm controllers, that is to say, the posture data in the trajectory file of the workpiece is converted into the Euler angles recognizable to the robot arm controllers.

Figure 6:
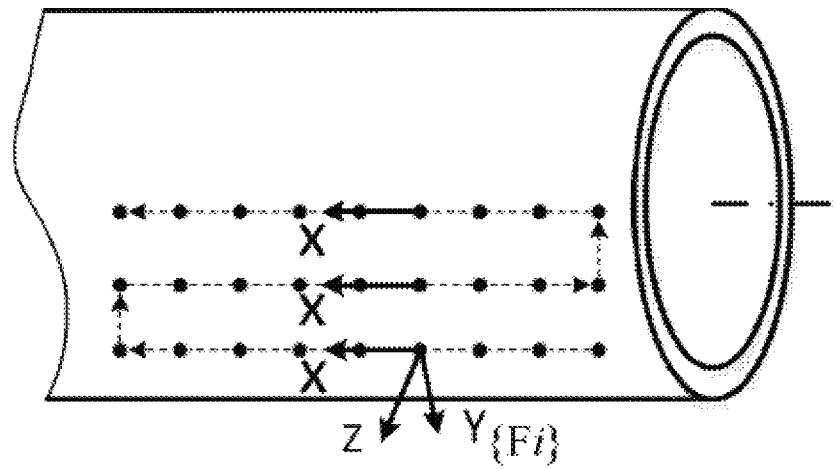
FIG. 6 is a schematic diagram of an auxiliary coordinate system.
Figure 7:
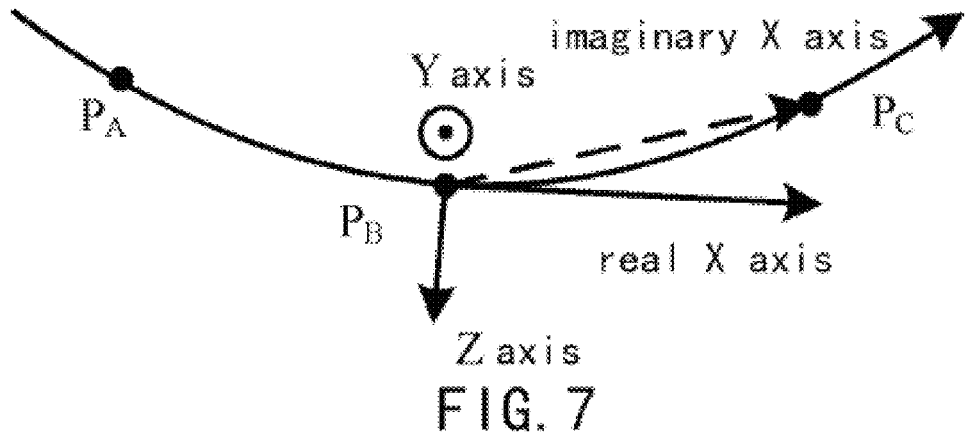
FIG. 7 is a schematic diagram showing a building process of the auxiliary coordinate system.

As shown in FIG. 6, the auxiliary coordinate system is defined in the coordinate system of the workpiece as follows. The X-axis of the auxiliary coordinate system {Fi} is set to be parallel to the trajectory path. Let the direction of the X-axis of the auxiliary coordinate system in an odd-numbered row points from the current point to the next point, and the direction of the X-axis of the auxiliary coordinate system in an even-numbered row points from the current point to the preceding point. That is to say, provision is made that the directions of the X-axes of the auxiliary coordinates system of all points on the trajectory are the same as the X-axis direction of the auxiliary coordinate system of a point in the first row, thereby minimizing the change of the postures of the effectors at the tail-end of the robot arms during the entire testing. Let the Z-axis of the auxiliary coordinate system be the normal vector direction of the discrete point. The Y-axis of the auxiliary coordinate system can be obtained by the cross product of the vectors according to the right-hand rule. However, when the trajectory path is a curve, the X-axis of the auxiliary coordinate system determined according to the above method is not a tangent of the trajectory, which will cause unstable movement. In this case, it is necessary to correct the X-axis. The enlarged view of a trajectory is shown in FIG. 7, in which the X axis of the auxiliary coordinate system defined by the method specified above is the secant direction of the trajectory, called the imaginary X-axis; the corrected X-axis is the tangent direction of trajectory, called the real X-axis.

The following is the theoretical derivation of the X-axis constraint method of the present disclosure.

(1) Correcting the X-Axis and Calculating the Rotation Matrix

Firstly, an imaginary X-axis of an auxiliary coordinate system is built. Suppose there are two points $b(x_b,y_b,z_b)$ on the and $c(x_c,y_c,z_c)$ on the imaginary X-axis, and ox' is represented as:

$$ox' = (x_c - x_b, y_c - y_b, z_c - z_b), \quad (4)$$

and the Z-axis of the auxiliary coordinate system is set as cutter shaft vector of the point b, that is:

$$oz = (t_x, t_y, t_z), \quad (5)$$

the Y-axis of the auxiliary coordinate system can be obtained by the cross product of the equations (5) and (4):

$$oy = oz \times ox' \quad (6)$$

$$= \begin{pmatrix} (t_y(z_c - z_b) - t_z(y_c - y_b), t_z(x_c - x_b) - \\ (t_x(z_c - z_b), t_x(y_c - y_b) - t_y(x_c - x_b)) \end{pmatrix}$$

$$= (oy_x, oy_y, oy_z)$$

further, the X-axis of the auxiliary coordinate system is corrected by the cross product of oy and oz:

$$ox = oy \times oz \quad (7)$$

$$= \begin{pmatrix} (t_z(x_c - x_b) - t_x(z_c - z_b))(z_c - z_b) - (t_x(y_c - y_b) - t_y(x_c - x_b))(y_c - y_b), \\ (t_x(y_c - y_b) - t_y(x_c - x_b))(x_c - x_b) - (t_y(z_c - z_b) - t_z(y_c - y_b))(z_c - z_b), \\ (t_y(z_c - z_b) - t_z(y_c - y_b))(y_c - y_b) - (t_z(x_c - x_b) - t_x(z_c - z_b))(x_c - x_b) \end{pmatrix}$$

$$= (ox_x, ox_y, ox_z)$$

In this way, the corrected X-axis is in the tangent direction of the trajectory, which ensures the perpendicular postures of the two probes in relative to the tested workpiece and a more stable movement.

Then, a projection matrix R of the auxiliary coordinate system in relative to the coordinate system of the workpiece, i.e., the rotation matrix of the auxiliary coordinate system in relative to the coordinate system of the workpiece, is obtained by normalizing ox, oy, and oz:

$$R = \begin{bmatrix} \dfrac{ox_x}{\sqrt{ox_x^2 + ox_y^2 + ox_z^2}} & \dfrac{oy_x}{\sqrt{oy_x^2 + oy_y^2 + oy_z^2}} & \dfrac{t_x}{\sqrt{t_x^2 + t_y^2 + t_z^2}} \\ \dfrac{ox_y}{\sqrt{ox_x^2 + ox_y^2 + ox_z^2}} & \dfrac{oy_y}{\sqrt{oy_x^2 + oy_y^2 + oy_z^2}} & \dfrac{t_y}{\sqrt{t_x^2 + t_y^2 + t_z^2}} \\ \dfrac{ox_z}{\sqrt{ox_x^2 + ox_y^2 + ox_z^2}} & \dfrac{oy_z}{\sqrt{oy_x^2 + oy_y^2 + oy_z^2}} & \dfrac{t_z}{\sqrt{t_x^2 + t_y^2 + t_z^2}} \end{bmatrix} = \quad (8)$$

$$\begin{bmatrix} n_x & o_x & p_x \\ n_y & o_y & p_y \\ n_z & o_z & p_z \end{bmatrix}$$

In the above equation, the first column represents the projection of the X-axis of the auxiliary coordinate system on the coordinate system of the workpiece, denoted by n; the second column represents the projection of the Y-axis of the auxiliary coordinate system on the coordinate system of the workpiece, denoted by o; and the third column represents the projection of the Z-axis of the auxiliary coordinate system on the coordinate system of the workpiece, denoted by p.

(2) Obtaining Euler angles based on an XYZ-Euler angles transformation matrix and a rotation matrix.

Based on the robotics and equal relation between the XYZ-Euler angles transformation matrix $R_{XYZ}$ and the rotation matrix of the coordinate system, it can be obtained:

$$R_{XYZ} = R_{X(\alpha)}R_{Y(\beta)}R_{Z(\gamma)} = \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix} = \quad (9)$$

$$\begin{bmatrix} \cos\beta\cos\gamma & -\cos\beta\sin\gamma & \sin\beta \\ \sin\alpha\sin\beta\cos\gamma + \cos\alpha\sin\gamma\gamma & -\sin\alpha\sin\beta\sin\gamma + \cos\alpha\cos\gamma & -\sin\alpha\cos\beta \\ -\cos\alpha\sin\beta\cos\gamma + \sin\alpha\sin\gamma & \cos\alpha\sin\beta\sin\gamma + \sin\alpha\cos\gamma & \cos\alpha\cos\beta \end{bmatrix} =$$

$$\begin{bmatrix} r_{11} & r_{12} & r_{13} \\ r_{21} & r_{22} & r_{23} \\ r_{31} & r_{32} & r_{33} \end{bmatrix} = R = \begin{bmatrix} n_x & o_x & p_x \\ n_y & o_y & p_y \\ n_z & o_z & p_z \end{bmatrix}$$

From the equation (9), it can be obtained:

$$\cos\beta = \pm\sqrt{r_{23}^2 + r_{33}^2} = \pm\sqrt{p_y^2 + p_z^2}, \quad (10)$$

during calculation, let $\cos\beta$ positive, that is, assuming $-90° \le \beta \le 90°$, it can be obtained:

$$\cos\beta = \sqrt{r_{23}^2 + r_{23}^2} = \sqrt{p_y^2 + p_z^2}, \quad (11)$$

when calculating $\alpha$, $\beta$ and $\gamma$, bivariate arctangent function $A\tan 2(y, x)$ (four-quadrant arctangent function) can be used to determine the quadrants of $\alpha$, $\beta$ and $\gamma$.

If $\cos\beta \ne 0$, then $$\alpha = A\tan 2(-r_{23}, r_{33}) \times 180/\pi = A\tan 2(-p_y, p_z) \times 180/\pi$$

$$\beta = A\tan 2(r_{13}, \sqrt{r_{23}^2 + r_{33}^2}) \times 180/\pi = A\tan 2(p_x, \sqrt{p_y^2 + p_z^2}) \times 180/\pi$$

$$\gamma = A\tan 2(-r_{23}, r_{11}) \times 180/\pi = A\tan 2(-n_y, n_x) \times 180/\pi. \quad (12)$$

If $\cos\beta = 0$, then the rotation matrix $R_{xyz}$ degenerates to:

$$R_{XYZ} = \begin{bmatrix} 0 & 0 & \sin\beta \\ \sin(\alpha + \gamma) & \cos(\alpha + \gamma) & 0 \\ -\cos(\alpha + \gamma) & \sin(\alpha + \gamma) & 0 \end{bmatrix}. \quad (13)$$

At this time, assuming $\alpha = 0$, then $$\alpha = 0$$

$$\beta = A\tan 2(r_{13}, 0) \times 180/\pi = A\tan 2(p_x, 0) \times 180/\pi$$

$$\gamma = A\tan 2(r_{21}, r_{22}) \times 180/\pi = A\tan 2(n_y, o_y) \times 180/\pi, \quad (14)$$

and further, $$[x, y, z, t_x, t_y, t_z] = [x, y, z, \alpha, \beta, \gamma]. \quad (15)$$

In this way, the discrete points obtained by trajectory planning can be converted into a trajectory file recognizable to the robot controllers, and the X-axis of the auxiliary coordinate system is constrained.

The X-axis constraint method provided is simple in terms of calculation, and is thus in particular suitable to a full-coverage testing of the semi-closed workpiece with a narrow internal space by the testing system of dual robot arms. The method also helps to avoid a collision accident among the effectors of the robot arms and the tested workpiece during testing.

The implementation steps of the method of the present disclosure are described as follows.

At a step 1, a coordinate system of a workpiece for the ultrasonic testing system of dual robot arms is defined.

Particularly, the two robot arms are controlled simultaneously to reach three points on a reference coordinate system of the workpiece via a teach box (first one is the origin of the coordinate system of the workpiece, second one is a point on the positive side of the X-axis of the coordinate system of the workpiece, and third one is a point on the xoy plane located in the positive direction of the Y-axis of the coordinate system of the workpiece), and the teach box is used to record these points, thereby determining relationships of the coordinate system of the workpiece relative to the base coordinate systems of the two robot arms.

At a step 2, a trajectory file of the tested workpiece is generated.

Particularly, the commercial CAM software is used to perform a preliminary trajectory planning on the tested workpiece and generate a trajectory file including coordinates and posture data. This trajectory file is generally a text file with a .txt suffix.

At a step 3, auxiliary coordinate systems are built in the coordinate system of the workpiece, the X-axis constraint method is used to constrain the X-axes of the auxiliary coordinate systems so that the positive direction of the X-axis of each of the auxiliary coordinate systems is the tangent direction of the trajectory, and the X-axis constraint method is used to convert the posture data generated in the Step 2 into Euler angles recognizable to the master and slave robot arm controllers.

At a step 4, the coordinates of the discrete points generated in the step 2 and the converted Euler angles of the discrete points in the step 3 are converted into the coordinates and the Euler angles of the base coordinate systems of the master and slave robot arms according to the relationships among the workpiece coordinate system and the base coordinate systems of the master and slave robot arms, and the resulting coordinates and Euler angles are downloaded to the master and slave robot arm controllers, respectively.

At a step 5, transformation relationships of tool coordinate systems of the master and slave robot arms in relative to flange coordinate systems of the master and slave robot arms is input to the master and slave robot arm controllers.

Particularly, the transformation relationship of the tool coordinate system {TM} of the master robot arm in relative to the flange coordinate system of the master robot arm is input to the master robot arm controller, and the transformation relationship of the tool coordinate system {TS} of the slave robot arm in relative to the flange coordinate system of the slave robot arm is input to the slave robot arm controller.

At a step 6, the tested workpiece is tested by the testing system of dual robot arms.

Particularly, the testing system of dual robot arms is brought into an operating state, the industrial computer is turned on, and the master and slave robot arm controllers control the master and slave robot arms having the probes respectively to comprehensively test the tested workpiece.

The above is only the preferred embodiments of the present disclosure and is not intended to limit the present disclosure. Any modifications, equivalent replacements, improvements and likes made within the spirit and principles of the present disclosure should be included in the scope of protection of the present disclosure.

The extension rod and the extension rod rotating shaft may also be mounted at the tail-end of the master robot arm. As a result, the extension rod and the extension rod rotating shaft mounted at the tail-ends of the master robot arm allow the master robot arm to extend into the interior of the tested workpiece, and the extension rod and the extension rod rotating shaft mounted at the tail-ends of the slave robot arm allow the slave robot arm to extend into the interior of the tested workpiece, for quality testing. The extension rod rotating shaft may be provided between the emitting probe and the robot arm, and may be provided between the receiving probe and the robot arm, so that the receiving probe and the emitting probe can be adjusted to be perpendicular to the surface of the workpiece, thereby receiving ultrasonic signals in a more effective way.

In addition, the robot arm can be provided with multiple extension rod rotating shafts connected in turn, if necessary, where the first ends of the extension rod rotating shafts connect with the extension rod and the last ends of the extension rod rotating shafts connect with the emitting probe or the receiving probe.

The master robot arm and the slave robot arm are two cooperating robot arms. The master robot arm can be mounted with one of the emitting probe and the receiving probe, while the slave robot arm can be mounted with the other one of the emitting probe and the receiving probe.

The invention claimed is:

1. An ultrasonic testing method by using an ultrasonic testing system of dual robot arms, comprising:
   a step 1 of calibrating a coordinate system of a tested workpiece for the ultrasonic testing system of dual robot arms, and determining relationships of the coordinate system of the tested workpiece relative to base coordinate systems of the master and slave robot arms;
   a step 2 of performing a trajectory planning on the tested workpiece to generate a trajectory file of discrete points of the coordinate system of the tested workpiece; the trajectory file including coordinates and posture data;
   a step 3 of building auxiliary coordinate systems in the coordinate system of the workpiece, using a X-axis constraint method to constrain the X-axes of the auxiliary coordinate systems so that a positive direction of the X-axis of each of the auxiliary coordinate systems is a tangent direction of the trajectory, and using the X-axis constraint method to convert the posture data of the discrete points generated in the step 2 into Euler angles;
   a step 4 of converting the coordinates of the discrete points generated in the step 3 and the converted Euler angles of the discrete points in the step 3 into coordinates and Euler angles of the base coordinate systems of the master and slave robot arms according to the relationships among the coordinate system of the workpiece and base coordinate systems of the master and slave robot arms, and then downloading the resulting coordinates and the Euler angles to the master and slave robot arm controllers, respectively;
   a step 5 of inputting transformation relationship of a tool coordinate system of the master robot arm relative to a flange coordinate system of the master robot arm to the master robot arm controller, and inputting transformation relationship of the tool coordinate system of the slave robot arm in relative to a flange coordinate system of the slave robot arm to the slave robot arm controller; and
   a step 6 of bringing the testing system of dual robot arms into an operating state, and controlling, by the master and slave robot arm controllers respectively, the master and slave robot arms having the probes to comprehensively test the tested workpiece.

2. The ultrasonic testing method as claimed in claim 1, wherein the step of using the X-axis constraint method to constrain the X-axes of the auxiliary coordinate systems includes:
   building an imaginary X-axis for each of the auxiliary coordinate systems in the coordinate system of the workpiece so that the imaginary X-axis is in a secant direction of the trajectory, and by taking two points $b(x_b, y_b, z_b)$ and $c(x_c, y_c, z_c)$ on the imaginary X-axis, expressing a vector of the imaginary X-axis as: $ox' = (x_c - x_b, y_c - y_b, z_c - z_b)$,
   setting a Z-axis of each of the auxiliary coordinate systems as a cutter shaft vector of each of the point b and expressing its vector as:

$$oz = (t_x, t_y, t_z)$$

obtaining a vector of a Y-axis for each of the auxiliary coordinate systems by the following equation:

$$oy = oz \times ox'$$
   $$= (t_y(z_c - z_b) - t_z(y_c - y_b), t_z(x_c - x_b) - t_x(z_c - z_b), t_x(y_c - y_b) - t_y(x_c - x_b))$$
   $$= (oy_x, oy_y, oy_z)$$

obtaining the vector of the corrected X-axis for each of the auxiliary coordinate systems by a cross product of oy and oz in order to be in a tangent direction of the trajectory, wherein the equation of the cross product is as follows:

$$ox = oy \times oz$$
   $$= \begin{pmatrix} (t_z(x_c - x_b) - t_x(z_c - z_b))(z_c - z_b) - (t_x(y_c - y_b) - t_y(x_c - x_b))(y_c - y_b), \\ (t_x(y_c - y_b) - t_y(x_c - x_b))(x_c - x_b) - (t_y(z_c - z_b) - t_z(y_c - y_b))(z_c - z_b), \\ (t_y(z_c - z_b) - t_z(y_c - y_b))(y_c - y_b) - (t_z(x_c - x_b) - t_x(z_c - z_b))(x_c - x_b) \end{pmatrix}$$
   $$= (ox_x, ox_y, ox_z).$$

3. The ultrasonic testing method as claimed in claim 2, wherein the converting step of the Euler angles in the step 3 includes obtaining the Euler angles of the coordinate system of the workpiece based on the equal relationship between an Euler angle transformation matrix and a rotation matrix:

$$\alpha = A\tan 2(-p_y, p_z) \times 180/\pi$$

$$\beta = A\tan 2(p_x, \sqrt{p_y^2 + p_z^2}) \times 180/\pi$$

$$\gamma = A\tan 2(-n_y, n_x) \times 180/\pi,$$

wherein $$p_x = \frac{t_x}{\sqrt{t_x^2 + t_y^2 + t_z^2}}; \quad p_y = \frac{t_y}{\sqrt{t_x^2 + t_y^2 + t_z^2}};$$

$$p_z = \frac{t_z}{\sqrt{t_x^2 + t_y^2 + t_z^2}}; \quad n_y = \frac{ox_y}{\sqrt{ox_x^2 + ox_y^2 + ox_z^2}};$$

$$n_x = \frac{ox_x}{\sqrt{ox_x^2 + ox_y^2 + ox_z^2}}.$$

* * * * *